Oct. 29, 1963

O. KOELLE 3,108,476

RECORDING APPARATUS FOR MEASURING SMALL CHANGES IN GAS VOLUME IN REACTION VESSELS

Filed June 13, 1960

INVENTOR.
OTTO KOELLE
BY
Attorney

United States Patent Office

3,108,476
Patented Oct. 29, 1963

3,108,476
RECORDING APPARATUS FOR MEASURING SMALL CHANGES IN GAS VOLUME IN REACTION VESSELS
Otto Koelle, Melsungen, Germany, assignor to Will Scientific, Inc., a corporation of New York
Filed June 13, 1960, Ser. No. 35,722
6 Claims. (Cl. 73—401)

The present invention relates to apparatus for manometric measurements.

The procedure for determining gas development or gas absorption during a chemical or biochemical reaction by the so-called Warburg apparatus is well known. The reaction is conducted in a closed reaction system in which the reaction vessel is connected to a manometer. Changes in the pressure of the gas in the closed reaction system, that are caused by gas evolution or absorption during the reaction, are directly proportional to changes in the quantity of gas in the closed system. Thus, changes in the manometer reading are directly proportional to the amount of gas evolved or consumed during the reaction under consideration.

The conventional Warburg apparatus consists of a constant temperature bath and a shaking apparatus. The constant temperature bath serves to maintain the gas temperature in the reaction system constant in order to avoid the possibility that variations in temperature might cause additive changes in pressure which would result in erroneous pressure readings. To assure good gaseous diffusion during the reaction, it is necessary to shake the reaction vessel during the experiment.

The reaction vessel is ordinarily submerged in the constant temperature bath, and is joined to the manometer through glass tubing that is ordinarily quite long since it must extend over the wall of the bath to connect with the manometer which is ordinarily mounted outside the bath. When the reaction vessel is shaken, the manometer will be shaken also.

Ordinarily a large number of reaction vessels and their associated manometers are mounted in a single shaking device. Because of this, difficulty is experienced in reading each manometer accurately during the course of the reaction. Especially when the frequency or amplitude of the shaking is great, an exact reading of the manometer is impossible during the process; on the contrary it is necessary to stop the shaking apparatus each time a reading is taken.

Unfortunately, there are serious disadvantages involved in stopping the shaking apparatus to take a reading, particularly when the amount of gas evolved or consumed during the reaction is large and where the reaction goes forward at a rapid rate since in stopping the shaking of a single manometer all the other manometers of the apparatus, including those which are not being read directly, are stopped, and thus the reaction vessels which are connected to those other manometers are stopped with the result that the diffusion process in those other vessels may be impaired.

Since the usual Warburg apparatus always has a plurality of manometers, for example fourteen, stoppage of the shaking apparatus for a reading time of only ten second means a total stoppage time of 140 seconds. If it is desired that the readings be taken at intervals of five minutes during the course of the reaction, it will be seen that the reaction vessels will be agitated for only about half the time of the experiment.

In carrying out investigations, in which small changes in amounts of gas are to be measured in proportionately small vessels, the successive reading of the manometer at short time intervals is very fussy and time-consuming, and frequently there appear errors in readings. This is particularly the case because the figures read, since they are taken when the reaction vessel is stopped, have to be multiplied by conversion factors to obtain correct readings.

Attempts already have been made to construct automatic registering apparatus for indicating the measurements shown by the different manometers. However, different difficulties have been encountered. The construction of the registering apparatus, with which there can be attained sufficiently accurate results, is very complicated, and such apparatus have proved faulty in operation; and their adjustment is time-consuming. The attempt to produce simpler apparatus for registering has heretofore, because of lack in accuracy of measurement, not proved satisfactory. The limits of error of the reading methods in unfavorable cases are in the order of the changes to be measured.

The primary object of the present invention is to provide an automatic indicating apparatus for use with manometers, and particularly with manometers employed with Warburg apparatus which will be simple in construction, easy to maintain in order, and accurate.

Another object of the present invention is to provide a registering apparatus for manometric measurement of the smallest changes in gas quantities, in which the elements for serving for registration do not influence the accuracy of measurement.

A further object of the invention is to provide apparatus for automatic registration of manometric measurements which will be direct-reading, so that evaluation of the measuring results is possible without the conversions heretofore necessary.

Other objects of the invention will be apparent hereinafter from the specification, the accompanying drawing, and the recital of the appended claims.

In the illustrated embodiment of the invention, a bottle is connected by a flexible tube and a cannula with the rubber sack or well of a manometer which in turn is connected with the reaction vessel. The tube contains a liquid, for example, water. Mounted in the bottle are a pair of electric contacts which are at different heights. With increase in the amount of gas in the reaction vessel the column of water in the tube is forced upwardly into the bottle. When the upper contact is immersed a reversible motor is started that drives in one direction an endless belt, which is connected by a pantograph linkage, for instance, with the bottle, to raise the bottle. With rise of the bottle the contacts are broken and the motor is stopped at the instant when the height of liquid has again reached the point at the end of the tube, which is adjacent the reaction vessel, which it had before the change in gas volume.

If the gas, instead of being evolved is consumed or absorbed, that is decreased in quantity, the action will be the reverse of that when the gas is generated.

The belt carries a stylus which engages a continuously rotating drum which is driven at a constant speed. Thus, the intermittent movements of the belt are recorded and thereby record increases or decreases in gas pressure in dependence on time during the progress of the reaction.

If, because of surface tension, a cone of liquid develops at the contact position of the electric contact, greater oscillations of the column of liquid are produced, these can be dampened by superimposing short thrust impulses on the liquid in the tube at suitable frequencies. These thrust impulses are preferably attained through short interval repeated compressions of the tube between the bottle and the reaction vessel. The superimposition of such thrust impulses is not in all cases necessary since, for example, through the vibratory motions of the manometer itself sufficiently heavy thrust impulses may exist. In certain circumstances, in fact, the thrust impulses from the vibratory motions of the manometer can be so large that it is preferable to provide a throttle in the connecting tube.

In a further modification of the new registering apparatus the scriber or stylus is fastened to the free end of the tube or a part participating in its motion in order that the course of the scriber may be changed in proportion to the course of the free end of the tube, preferably in the limits of 0.5 to 3. Thereby it is possible from the designed thrust indication to read directly the change of the gas amount.

For this the following relation exists:

$$x = k.h$$

where $x$ is the gas quantity developed or used during the investigation, related to the normal state;
$k$ is the vessel constant (the volume of the reaction vessel); and
$h$ is the change in pressure at the manometer in millimeters of the Brodie column.

In most cases one uses as the interspacing liquid water loaded with sodium chloride, whose density amounts to 1.033, the so-called Brodie solution. With other interspacing liquids another constant is to be considered. The vessel constant is determined according to the following equation:

$$k = \frac{V_G \frac{273}{T} + a \cdot V_F}{10000}$$

where $k$ is the vessel constant;
$V_G$ is the gas volume in the reaction system (measured in milliliters);
$T$ is the sought temperature in degrees (Kelvin);
$a$ is the Bunsen absorption coefficient; and
$V_F$ is the volume of liquid in the reaction system (milliliters).

If the vessel constant does not differ very much from the value $k=1.0$, then the reduction or indication can be attained through simple inclination of the registering apparatus. This is practical only for the value $k=1$, for then the inclination angle of the transport apparatus for the free end of the tube or of the bottle must be so adjusted that its reciprocal sine value corresponds to the value of the vessel constant.

In order to avoid having to make a conversion of the attained value of the reading to the normal state, an additional vessel is provided of proportionately large volume, with which the space above the liquid surface in the bottle is connected preferably by a capillary, flexible conduit. The gas content of this additional vessel is held at a constant temperature during the test, after it has been adjusted previously to a pressure of 760 mm./Hg. If one wishes to give the measuring results at another pressure value this is adjusted in the additional vessel before the beginning of the test.

Figures 1, 2, 3:
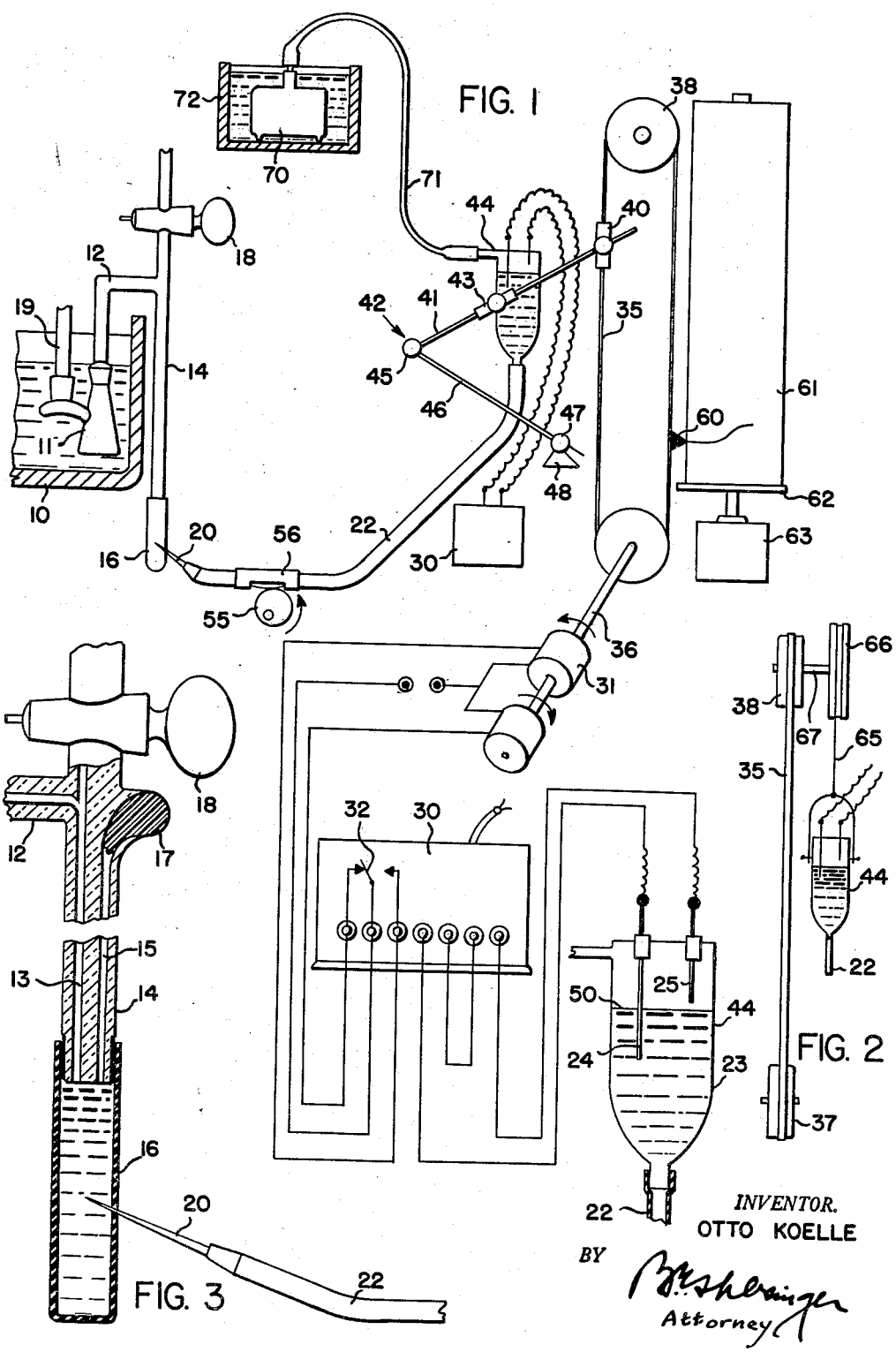
FIG. 1 shows a complete assembly diagrammatically of one embodiment of the invention.
FIG. 2 is a fragmentary view taken at right angles to FIG. 1 further illustrating the means for supporting the bottle.
FIG. 3 is a fragmentary section showing on an inlarged scale the connection of the movable tube to the manometer.

10 denotes the constant temperature bath, and 11 is the reaction vessel. The reaction vessel is connected by a glass tube 12 with one capillary duct 13 of a conventional double capillary manometer 14 on the lower end of which is mounted in conventional manner a rubber fluid sack or well 16.

Before the test the upper end of the capillary 15 of the manometer is closed by wax or putty, as denoted at 17, so that it is shut off. A pet-cock or valve 18 closes the upper end of capillary 13 above its connection with tube 12.

A cannula or needle 20 having a capillary bore therein is inserted through the wall of the sack 16 to provide a fluid-tight connection between the sack and one end of a flexible tube 22. The other end of this tube 22 is connected to a bottle or vessel 44.

Mounted in the upper end of the bottle 23 are two electrical contacts 24 and 25, one of which (24) extends further down into the bottle than the other. These contacts are connected through a conventional relay and controller 30 with the field windings of a motor 31. The relay (not shown) operates the switch 32 of the controller to effect rotation of the motor in opposite directions.

The motor drives an endless belt 35 through armature shaft 36 and pulley 37. The belt travels over pulley 37 and idler pulley 38. Secured to the belt 35 to travel therewith is a clip 40 on which is pivotally mounted one arm 41 of a pantograph-type linkage, designated as a whole at 42. The arm 41 is pivotally connected to a yoke 43 from which a bottle 44 is suspended. The arm 41 is pivotally connected at 45 with the arm 46 of the linkage which in turn is pivotally connected at 47 to a fixed plate 48.

In operation the reversible motor 31 is so controlled from the electrical relay 30 that through alternate up and down drive of the belt 35 the level 50 of liquid is continuously held at substantially the same height in the vessel 44. Initially if there is an increase in volume (pressure) of gas in the reaction vessel 11, the liquid will rise in the bottle 44. This will submerge the electrode 25, and the motor will be actuated to drive the belt 35 in the direction to raise the bottle 44. This will cause electrode 25 to be raised clear of the surface 50 of the liquid in the bottle; and the motor will be reversed to cause the belt to be driven in the direction to lower the bottle 44 again. Upon downward motion of the vessel 44 the liquid rises in the vessel 44 and again submerges the contact 25, which is preferably adjustable in height. Thereby through the electrical relay 30 reversal of the motor 31 will again be produced. The vessel 44 will then be raised again until the surface 50 of the liquid is disconnected from the contact 25. Then there takes place again a reversal of the belt drive 35. In consequence of this control, the vessel 44 thus always reciprocates through a small amplitude about the height position, which corresponds to the pressure in the reaction vessel 11 which is connected to the vessel 44.

If thereby because of the surface tension between the upper surface 50 of the liquid in the vessel 44 and the contact 25 a liquid cone should be developed and greater reciprocations of the liquid should be required, this can be avoided through superimposition of short thrust impulses of suitable frequency. This may be achieved through use of a rotary cam 55, that is driven continuously in one direction by any suitable means and that engages a follower 56 that is secured to tube 22 intermediate the ends of the tube. The cam will alternately lift the tube up and allow it to fall down thereby producing an undulation of the liquid in the tube, which may be of small amount, depending on the shape of the cam, and of any desired frequency, depending on the rate of rotation of the cam. The undulatory motion of the liquid produced by the cam is superimposed to correct for any cone produced by surface tension on the surface 50 of the liquid in the bottle 44.

Mounted on the belt 35 is a stylus or scriber 60. This engages a sheet of graph paper 61 that is secured about the periphery of a drum 62 that is driven continuously at a uniform velocity as by means of a motor 63. The bottle 44 has a known volume equal to the vessel constant or known volume of the reaction vessel; and the bottle is linked at a point 43 of the linkage system whose vertical motion has a ratio to the motion of the scriber or stylus 60 corresponding to the vessel constant (known volume).

The transport apparatus 35, 31, the electrical relay 30 and the paper drum 62 can be mounted together in a single unit or assembly; and the mechanism 55, 56 for producing the thrust impulses can be included in that unit or assembly also. The pressure impulses, which serve for quick breaking of the surface 50 of the liquid in the bottle 44 away from the electrode 25, are preferably produced by compression of the tube 22.

In many cases the mechanism 55, 56 is not necessary for generation of the thrust impulses, since because of the accelerated power of the liquid in the tube 22, which is produced by the shaking motion of the manometer 14, sufficiently heavy pressure impulses already exist to break the surface tension between the surface 50 of the liquid and the electrode 25. Under some circumstances a throttle in the tube 22 is preferable in order to be able to limit or adjust the strength of these conditioned pressure impulses produced through the shaking motion.

Also, in place of the thrust impulses, the electrode 25 can be moved in height a small, preferably adjustable amount periodically relative to the vessel 44 in order thus to avoid building up of a cone between the electrode 25 and the liquid. Thereby too severe reciprocation of the vessel 44 and of the scriber 60 can be avoided.

Instead of the above-described pantograph-like apparatus 42, other mechanism can be used. So, for example, between the vesesl 44 and the scriber 60 there could be interposed a stepless changeable drive with whose help the height position of the vessel 44 and the position of the scriber 60 which is determined by the amount of the vessel constant (volume) can be adjusted before the test.

The scope of measurement of the known Warburg manometer 14 is itself dependent upon the specific gravity of the blocking liquid and upon the scale length of the manometer. In most cases there is used as a blocking liquid water fortified with sodium chloride whose specific gravity is adjusted to 1.033, the so-called Brodie solution. In special cases an increase of the range of measurement is desirable. One uses then thallium formate with a specific gravity of approximately 4. The adjustment of the intermediate values or of the values between 4 and 13 is difficult or impossible.

An advantage of the registering apparatus of the invention consists in that practical volume measurement ranges can be handled, in which a drive roll of the transport apparatus is coupled through a drive with a fixed transmission ratio with an additional transport apparatus for the vessel so that its height adjustability can be further extended at will.

It is also possible, in place of fastening the vessel on the pantograph system 42 to fasten a cord 65 (FIG. 2) adjustably, which is secured to a pulley 66 that is fastened on the shaft 67 to which the pulley 38 is secured. Hence as the pulley 38 rotates in one direction or the other, the bottle 44 is raised or lowered.

In order to avoid having to make conversions of readings to the normal state an additional vessel 70 of proportionately large volume may be provided which is connected with the space above the surface 50 of the liquid in the vessel 44 by a preferably capillary flexible conduit 71. The gas content of this additional vessel 70 is held during the test at a constant temperature after the pressure has been previously adjusted to 760 mm./Hg. If the measuring results are to be related to other pressure values this can be adjusted in the additional vessel 70 before the beginning of the test. The temperature in vessel 70 can be maintained by placing it in a temperature bath 72.

While the invention has been described in connection with a specific embodiment thereof, it will be understood that it is capable of further modification, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. Measuring apparatus for measurement of small changes in gas quantity in a reaction vessel where the reaction vessel is rigidly connected with a capillary manometer and both the reaction vessel and the manometer are shaken during the reaction and the capillary duct of the manometer is connected at one end to the reaction vessel and at the other end to a liquid well, comprising a second vessel having a volume corresponding to the volume of the reaction vessel, a flexible tube communicating at one end with said well and at its opposite end with said second vessel and filled with a column of liquid, and means operable by changes in height of liquid in said second vessel in accordance with variations in pressure in the reaction vessel for varying the height of said second vessel, thereby to restore the liquid in said second vessel to a null point in its height in said second vessel, and means for indicating movements of said second vessel.

2. Measuring apparatus as claimed in claim 1 wherein said means for varying the height of said second vessel comprises a reversible electric motor, a pair of contacts positioned in said second vessel to reverse the direction of rotation of said motor upon rise and fall, respectively, of the level of liquid in said second vessel, the liquid serving to bridge said contacts and close a circuit to said motor when the liquid is at a predetermined height in said second vessel, and means driven by said motor to raise or lower said second vessel depending on the direction of rotation of said motor.

3. Measuring apparatus as claimed in claim 2, wherein means are provided for periodically compressing and releasing said tube to superimpose periodic fluctuations of said column of liquid on those due to changes in volume of gas in the reaction vessel, thereby to dampen fluctuations in position of said column of liquid in said tube.

4. Measuring apparatus for measurement of small changes in gas quantity in a reaction vessel where the reaction vessel is shaken during the reaction and has a capillary manometer fixedly attached thereto which is shaken with the reaction vessel, and said manometer has a flexible rubber-like sack secured to its lower end, comprising a cannula inserted into said sack and having a capillary bore, a second vessel, a flexible tube connected to said cannula with its bore communicating at one end with the bore of said cannula and at its opposite end with said second vessel and filled with a column of liquid, whereby variations in pressure in the reaction vessel cause variations of level of liquid in said second vessel, and means actuated by variation of level of liquid in said second vessel for varying the height of said second vessel to restore to a predetermined point the level of liquid in said second vessel.

5. Measuring apparatus as claimed in claim 4 wherein said height varying means comprises an electric motor, and a pair of electrodes positioned in the top of said second vessel, one of which is at a different height from the other, and which are adapted to be bridged by the upper surface of the liquid in said second vessel when the liquid is at a predetermined height thereby to close an electric circuit to said motor, said circuit being broken again upon recession of said liquid upon raising of said second vessel.

6. Measuring apparatus as claimed in claim 5 having means for periodically compressing and releasing said tube to superimpose periodic fluctuations of said column of liquid on those due to changes in volume of gas in the reaction vessel, thereby to dampen fluctuations in said column of liquid to compensate for surface tension between the liquid in said second vessel and the higher electrode.

References Cited in the file of this patent
UNITED STATES PATENTS

| | | |
|---|---|---|
| 2,326,797 | Peterson | Aug. 17, 1943 |
| 2,354,945 | Cohen et al. | Aug. 1, 1944 |
| 2,380,177 | Hicks | July 10, 1945 |
| 2,698,539 | Gridel et al. | Jan. 4, 1955 |
| 2,851,404 | Jackson et al. | Sept. 9, 1958 |
| 2,942,466 | Barron et al. | June 28, 1960 |